US010838449B2

(12) United States Patent
Geukes et al.

(10) Patent No.: US 10,838,449 B2
(45) Date of Patent: Nov. 17, 2020

(54) AUTOMATIC DETECTION OF CLOCK GRID MISALIGNMENTS AND AUTOMATIC REALIGNMENT

(71) Applicant: International Business Machines Corporation, Armonk, NY (US)

(72) Inventors: Benedikt Geukes, Stuttgart (DE); Matteo Michel, Chemnitz (DE); Manfred Walz, Grömbach (DE)

(73) Assignee: International Business Machines Corporation, Armonk, NY (US)

( * ) Notice: Subject to any disclaimer, the term of this patent is extended or adjusted under 35 U.S.C. 154(b) by 131 days.

(21) Appl. No.: 16/027,948

(22) Filed: Jul. 5, 2018

(65) Prior Publication Data

US 2020/0012312 A1   Jan. 9, 2020

(51) Int. Cl.
*G06F 1/04* (2006.01)

(52) U.S. Cl.
CPC ..................... *G06F 1/04* (2013.01)

(58) Field of Classification Search
CPC ........................................... G06F 1/04
USPC .......................................... 713/503
See application file for complete search history.

(56) References Cited

U.S. PATENT DOCUMENTS

| 5,434,996 A * | 7/1995 | Bell | G06F 13/405 |
| | | | 348/E7.084 |
| 5,712,882 A * | 1/1998 | Miller | G01R 31/31922 |
| | | | 375/356 |
| 5,734,685 A * | 3/1998 | Bedell | H04L 7/0008 |
| | | | 375/356 |
| 5,909,452 A * | 6/1999 | Angelotti | G01R 31/318544 |
| | | | 714/726 |
| 6,173,435 B1 * | 1/2001 | Dupenloup | G06F 30/30 |
| | | | 716/104 |
| 6,205,572 B1 * | 3/2001 | Dupenloup | G06F 30/327 |
| | | | 716/106 |
| 6,249,891 B1 * | 6/2001 | Matsumura | G01R 31/318307 |
| | | | 714/724 |
| 6,320,436 B1 * | 11/2001 | Fawcett | G06F 1/10 |
| | | | 327/158 |
| 6,324,485 B1 * | 11/2001 | Ellis | G01R 31/31905 |
| | | | 702/108 |
| 6,424,688 B1 * | 7/2002 | Tan | G06F 1/12 |
| | | | 375/354 |
| 6,442,722 B1 * | 8/2002 | Nadeau-Dostie | |
| | | | G01R 31/318552 |
| | | | 714/729 |

(Continued)

OTHER PUBLICATIONS

Abdelhadi et al., *Timing-Driven Variation-Aware Nonuniform Clock Mesh Synthesis*, Proceedings of the 20th symposium on Great lakes symposium on VLSI (GLSVLSI '10), May 2010, pp. 15-20, ACM New York, NY.

*Primary Examiner* — Paul R. Myers
(74) *Attorney, Agent, or Firm* — Nathan M. Rau (57) ABSTRACT

Automatic detection of clock grid misalignments and automatic realignment including loading a test pattern into a first storage element on a first clock grid on a circuit; scanning the test pattern from the first storage element on the first clock grid to a second storage element on a second clock grid on the circuit; reading the scanned test pattern from the second storage element on the second clock grid; evaluating the scanned test pattern for errors; and in response to detecting an error in the scanned test pattern, triggering an alignment of the first clock grid and the second clock grid.

20 Claims, 6 Drawing Sheets

(56) References Cited

U.S. PATENT DOCUMENTS

| | | | |
|---|---|---|---|
| 6,553,505 B1 * | 4/2003 | Brown | H04L 7/046 713/401 |
| 6,970,815 B1 * | 11/2005 | Bombal | G01R 31/318591 703/15 |
| 7,210,082 B1 * | 4/2007 | Abdel-Hafez | G01R 31/318307 714/700 |
| 8,271,929 B2 | 9/2012 | Laub | |
| 8,922,264 B1 | 12/2014 | Chong et al. | |
| 2002/0184560 A1 * | 12/2002 | Wang | G01R 31/31704 714/25 |
| 2003/0115524 A1 * | 6/2003 | Johnston | G01R 31/31727 714/726 |
| 2004/0153926 A1 * | 8/2004 | Abdel-Hafez | G01R 31/318385 714/726 |
| 2004/0163021 A1 * | 8/2004 | Nadeau-Dostie | G01R 31/318577 714/726 |
| 2004/0243896 A1 * | 12/2004 | Jaber | G01R 31/318541 714/726 |
| 2004/0250185 A1 * | 12/2004 | Date | G01R 31/318536 714/726 |
| 2005/0195928 A1 * | 9/2005 | Yamazaki | G01R 31/31725 375/354 |
| 2005/0240847 A1 * | 10/2005 | Nadeau-Dostie | G01R 31/31858 714/726 |
| 2006/0242449 A1 * | 10/2006 | Frederick | G01R 31/31727 713/600 |
| 2007/0283205 A1 * | 12/2007 | Chelstrom | G01R 31/318552 714/727 |
| 2008/0072093 A1 * | 3/2008 | Baumgartner | G06F 1/12 713/400 |
| 2008/0080654 A1 * | 4/2008 | Klowden | H04L 25/14 375/371 |
| 2009/0113263 A1 * | 4/2009 | Cannon | G01R 31/318536 714/726 |
| 2011/0121838 A1 * | 5/2011 | Gillis | G01R 31/318544 324/537 |
| 2011/0209112 A1 | 8/2011 | Laub | |
| 2011/0296265 A1 * | 12/2011 | Rakheja | G01R 31/318558 714/731 |
| 2015/0168992 A1 | 6/2015 | Choi | |

* cited by examiner

AUTOMATIC DETECTION OF CLOCK GRID MISALIGNMENTS AND AUTOMATIC REALIGNMENT

BACKGROUND

Field of the Invention

The field of the invention is data processing, or, more specifically, methods, apparatus, and products for automatic detection of clock grid misalignments and automatic realignment.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Methods, systems, and apparatus for automatic detection of clock grid misalignments and automatic realignment are disclosed in this specification. Automatic detection of clock grid misalignments and automatic realignment includes loading a test pattern into a first storage element on a first clock grid on a circuit; scanning the test pattern from the first storage element on the first clock grid to a second storage element on a second clock grid on the circuit; reading the scanned test pattern from the second storage element on the second clock grid; evaluating the scanned test pattern for errors; and in response to detecting an error in the scanned test pattern, triggering an alignment of the first clock grid and the second clock grid.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
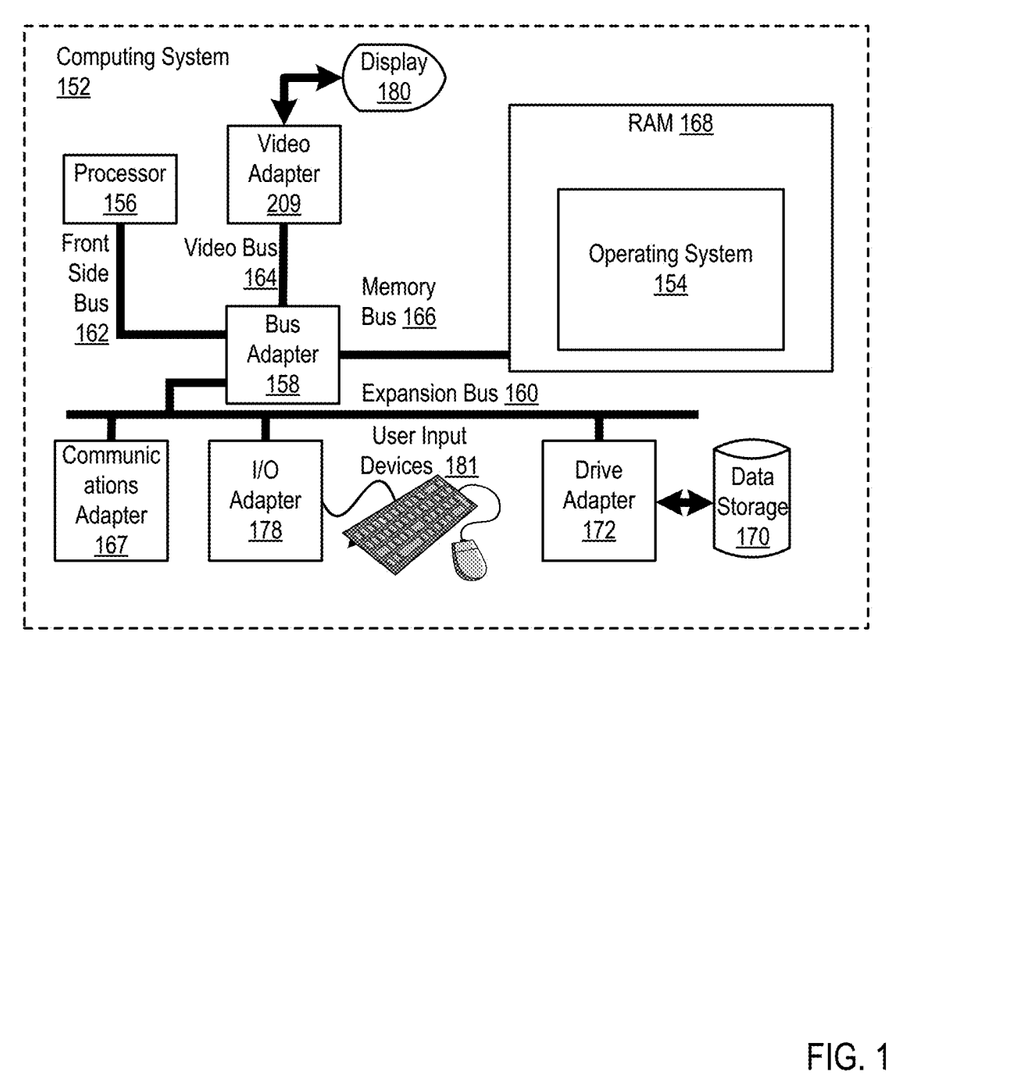
FIG. 1 sets forth a block diagram of an example system configured for automatic detection of clock grid misalignments and automatic realignment according to embodiments of the present invention.

Exemplary methods, apparatus, and products for automatic detection of clock grid misalignments and automatic realignment in accordance with the present invention are described with reference to the accompanying drawings, beginning with FIG. 1. FIG. 1 sets forth a block diagram of automated computing machinery comprising an exemplary computing system (152) configured for automatic detection of clock grid misalignments and automatic realignment according to embodiments of the present invention. The computing system (152) of FIG. 1 includes at least one computer processor (156) or 'CPU' as well as random access memory (168) ('RAM') which is connected through a high speed memory bus (166) and bus adapter (158) to processor (156) and to other components of the computing system (152).

Stored in RAM (168) is an operating system (154). Operating systems useful in computers configured for automatic detection of clock grid misalignments and automatic realignment according to embodiments of the present invention include UNIX™, Linux™, Microsoft Windows™, AIX™, IBM's i OS™, and others as will occur to those of skill in the art. The operating system (154) in the example of FIG. 1 is shown in RAM (168), but many components of such software typically are stored in non-volatile memory also, such as, for example, on a disk drive.

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of data storage (170). Disk drive adapters useful in computers configured for automatic detection of clock grid misalignments and automatic realignment according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for automatic detection of clock grid misalignments and automatic realignment according to embodiments of the present invention include modems for wired dial-up communications, Ethernet (IEEE 802.3) adapters for wired data communications, and 802.11 adapters for wireless data communications.

Figure 2:
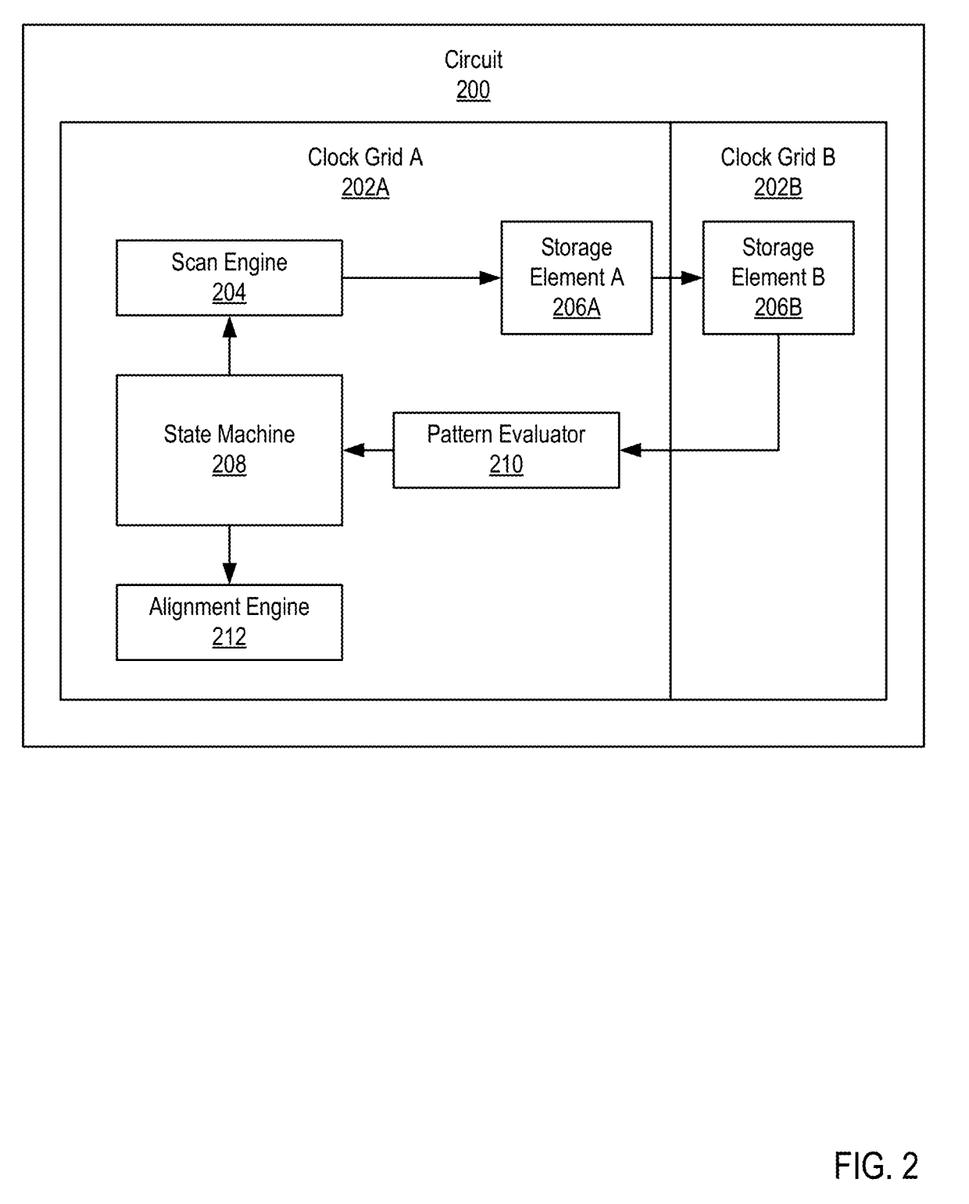
FIG. 2 sets forth a block diagram of an example system configured for automatic detection of clock grid misalignments and automatic realignment according to embodiments of the present invention.

FIG. 2 shows an exemplary circuit for automatic detection of clock grid misalignments and automatic realignment according to embodiments of the present invention. The exemplary circuit in FIG. 2 may be an integrated circuit, such as the processor (156) of FIG. 1. As shown in FIG. 2, the exemplary circuit (200) includes two clock grids (clock grid A (202A), clock grid B (202B)). Clock grid A (202A) includes a scan engine (204), storage element A (206A), a state machine (208), a pattern evaluator (210), and an alignment engine (212). Clock grid B (202B) includes storage element B (206B). Although FIG. 2 is shown as including the scan engine (204), the state machine (208), the pattern evaluator (210), and the alignment engine (212), those elements may be located outside of clock grid A (202A).

The circuit (200) may be an integrated circuit, such as a computer processor. The circuit includes multiple clock grids (clock grid A (202A), clock grid B (202B)). Each clock grid (clock grid A (202A), clock grid B (202B)) is circuitry that carries a clock signal to components on the circuit (200). Although only two clock grids are shown within the circuit (200) of FIG. 2, many more clock grids may reside on a circuit.

Each clock grid (clock grid A (202A), clock grid B (202B)) is a separate grouping of circuitry coupled to circuitry carrying the same clock signal. Different clock grids carry a different clock signal (although may have a common signal source). Due to various factors including grid size, travel distance, and propagation medium, two clock signals on two clock grids that were once aligned may become misaligned. Two clock grids (clock grid A (202A), clock grid B (202B)) are misaligned when the rising and falling edges of the clock signal do not occur simultaneously or do not occur sufficiently close in time. If two clock grids are misaligned, a high or low bit scanned from a first storage element on one clock grid to a second storage element on another clock grid may not be stored correctly in the second storage element.

The scan engine (204) is circuitry that receives a test pattern and loads the test pattern onto storage element A (206A). The scan engine (204) receives a signal from the state machine (208) to begin the alignment test by loading the test pattern onto storage element A (206A). Once initiated by the state machine, the scan engine (204) shifts each bit of the test pattern into storage element A (206A). The bits (i.e., signals) may be shifted one at a time as they are scanned from the storage element A (206) to storage element B (206B).

Each storage element (storage element A (206A), storage element B (206B)) is circuitry configured to store data in the form of a high or low bit (i.e., signal). Each storage element (storage element A (206A), storage element B (206B)) may be a circuit latch that stores either a high signal or a low signal. The signals stored in the storage elements may be scanned using a clock signal. Scanning a bit from a first storage element to a second storage element refers to transferring or copying the bit from the first storage element to the second storage element using a clock signal. As shown in FIG. 2, storage element A (206A) operates within clock grid A (202A) and storage element B (206B) operates within clock grid B (202B).

The pattern evaluator (210) is circuitry that reads the scanned test pattern from storage element B (206B) and evaluates the scanned test pattern for errors. The pattern evaluator may receive an unscanned test pattern (e.g., from the state machine) and compare each bit read from storage element B (206B) to the corresponding bit in the unscanned test pattern. The unscanned test pattern is identical to the test pattern loaded by the scan engine into storage element A (206A).

The pattern evaluator (210) may read bits (i.e., signals) from storage element B (206B) without assessing the quality of the signal received. Specifically, the pattern evaluator (210) reads either a high signal or a low signal from storage element B (206B) without reading or receiving an indication of the quality of the signal read.

The state machine (208) is circuitry that initiates a test of the alignment between two clock grids (clock grid A (202A), clock grid B (202B)) and triggers an alignment engine (212) if the alignment test indicates that the clock grids are misaligned (e.g., in response to the pattern evaluator (210) determining that the scanned test pattern does not match the unscanned test pattern). The state machine (208) may also select a test pattern for the alignment test and send a notification to a higher-level process if the test indicates that the clock grids are aligned.

The alignment engine (212) is circuitry that aligns clock grid A (202A) and clock grid B (202B). The alignment engine (212) may receive a signal from the state machine (208) that clock grid A (202A) and clock grid B (202B) are misaligned. In response the alignment engine (212) initializes a process to align clock grid A (202A) and clock grid B (202B).

Figure 3:
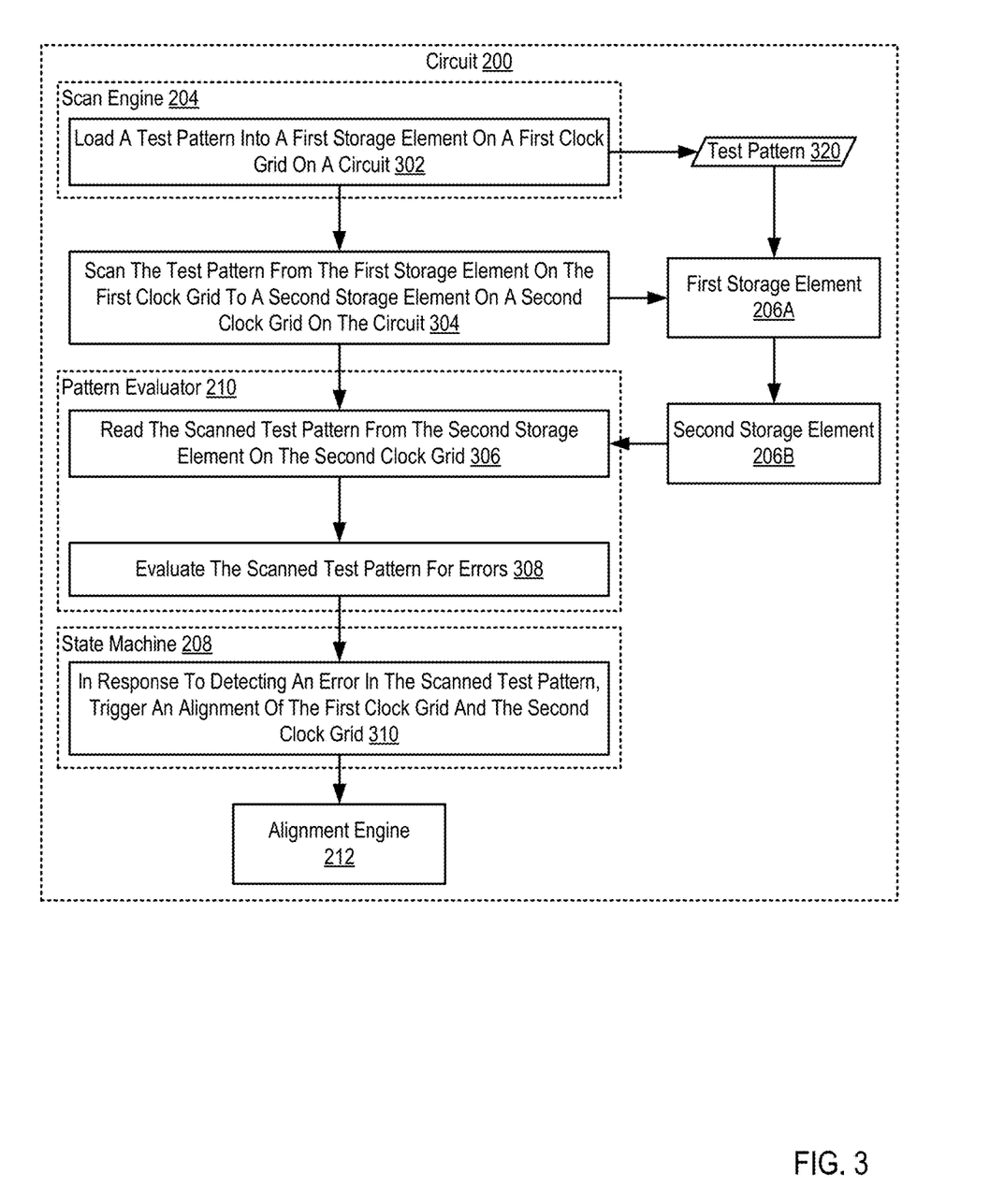
FIG. 3 sets forth a flow chart illustrating an exemplary method for automatic detection of clock grid misalignments and automatic realignment according to embodiments of the present invention.

For further explanation, FIG. 3 sets forth a flow chart illustrating an exemplary method for automatic detection of clock grid misalignments and automatic realignment according to embodiments of the present invention that includes loading (302) a test pattern (320) into a first storage element (206A) on a first clock grid on a circuit (200). Loading (302) a test pattern (320) into a first storage element (206A) on a first clock grid on a circuit (200) may be carried out by loading the test pattern on a scan engine (204), loading the test pattern on a pattern evaluator (210), and loading, by the scan engine (204), the test pattern into the first storage element.

Each test pattern may be one or a series of high and low signals (i.e., 0 bits and 1 bits). The test pattern is designed to challenge the ability of the storage elements to receive and maintain the scanned in signals until the signals are read out. One or more test patterns may be preloaded onto the scan engine (204) and the pattern evaluator (210) and stored within those elements or in a location accessible by those elements. Alternatively, the test pattern may be loaded onto the scan engine (204) and the pattern evaluator (210) by the state machine (208) or other entity that provides the test pattern.

Loading (302) a test pattern (320) into a first storage element (206A) on a first clock grid on a circuit (200) may be initiated in response to the state machine (208) determining that an alignment test should be initiated. The state machine (208) may determine that an alignment test should be initiated based on a number of different factors. The state machine (208) may initialize an alignment test in response to determining that an alignment of the clock grids has been performed by the alignment engine. The alignment test would be initialized to verify that the performed alignment by the alignment engine was successful.

The state machine (208) may initialize an alignment test in response to determining that a set period of time has elapsed. The state machine (208) may be configured to initialize an alignment test at regular intervals. The state machine (208) may also initialize an alignment test in response to detecting that a critical operation on the circuit is beginning. Finally, the state machine (208) may initialize an alignment test in response to receiving a signal to perform the alignment test from a higher-level process.

The method of FIG. 3 further includes scanning (304) the test pattern (320) from the first storage element (206A) on the first clock grid to a second storage element (206B) on a second clock grid on the circuit (200). Scanning (304) the test pattern (320) from the first storage element (206A) on the first clock grid to a second storage element (206B) on a second clock grid on the circuit (200) may be carried out by the circuitry on the circuit using the clock signals of the first clock grid and the second clock grid to transfer the bit along the scan path between the first storage element (206A) and the second storage element (206B).

The method of FIG. 3 further includes reading (306) the scanned test pattern from the second storage element (206B) on the second clock grid. Reading (306) the scanned test pattern from the second storage element (206B) on the second clock grid may be carried out by the pattern evaluator (210) accessing the second storage element (206B) and reading out the high or low signal or signals stored in the second storage element (206B). Reading (306) the scanned test pattern from the second storage element (206B) on the second clock grid may be performed without a determination of the quality of the signal or signals read from the second storage element (206B). Once the test pattern is loaded into the first storage element (206A) and scanned into the second storage element (206B), the test pattern becomes a scanned test pattern.

The method of FIG. 3 further includes evaluating (308) the scanned test pattern for errors. Evaluating (308) the scanned test pattern for errors may be carried out by the comparing, by the pattern evaluator (210), the scanned test pattern to the unscanned test pattern loaded onto the pattern evaluator (e.g., preloaded or by the state machine (208)). The pattern evaluator (210) may use an unscanned test pattern to determine whether the scanned test pattern includes any signals that differ from the unscanned test pattern.

The method of FIG. 3 further includes in response to detecting an error in the scanned test pattern, triggering (310) an alignment of the first clock grid and the second clock grid. Detecting an error in the scanned test pattern may be carried out by that state machine (208) receiving an indication from the pattern evaluator (210) that an error has been detected in the scanned test pattern or an indication that the scanned test pattern does not match the unscanned test pattern. Triggering (310) an alignment of the first clock grid and the second clock grid may be carried out by the state machine (208) sending a signal to the alignment engine (212) to begin an alignment process to realign the first clock grid and the second clock grid.

As an example of the above, consider the following. The state machine (208) determines that an alignment test is to be performed. The state machine (208) sends a signal to the scan engine (204) to begin loading a test pattern onto the first storage element (206A). Assume, for the purpose of this example, that the test pattern is "high-low-high-high-high-low-low-high-low", or "101110010". The scan engine (204) begins loading the test pattern into the first storage element (206A) on the first clock grid by placing the first signal ("1") into the first storage element. The first signal is then scanned from the first storage element (206A) to the second storage element (206B) on the second clock grid. After the first signal ("1") is scanned into the second storage element (206B), the scan engine (204) places the second signal ("0") into the first storage element, and so on.

Continuing with the example, after the first signal is scanned into the second storage element (206B), the pattern evaluator (210) reads the signal from the second storage element (206B). Assume that the pattern evaluator (210) reads a "1" signal from the second storage element (206B). The pattern evaluator (210) then accesses an unscanned test pattern and compares the read signal to the corresponding first signal in the unscanned test pattern. Because the signal read from the second storage element (206B) matches the corresponding signal from the unscanned test pattern, no error is detected.

Continuing with the example, after the second signal is scanned into the second storage element (206B), the pattern evaluator (210) reads the signal from the second storage element (206B). Assume, however, that the pattern evaluator (210) reads a "1" signal from the second storage element (206B). The pattern evaluator (210) then accesses the unscanned test pattern and compares the read signal to the corresponding second signal in the unscanned test pattern. Because the signal read from the second storage element (206B) does not match the corresponding signal from the unscanned test pattern, an error is detected. Once the error has been detected, the pattern evaluator (210) sends a signal to the state machine (208) that the scanned test pattern does not match the unscanned test pattern. In response, the state machine (208) triggers the alignment engine (212) to begin the alignment process.

The above steps improve the operation of the computer system by testing the alignment between two clock grids on a circuit. Misaligned clock grids may lead to read errors of data transferred across the clock grids. By testing the alignment between clock grids, a computing system is able to address the misalignment to increase the reliability and accuracy of data sent within a circuit on the computing system.

Figure 4:
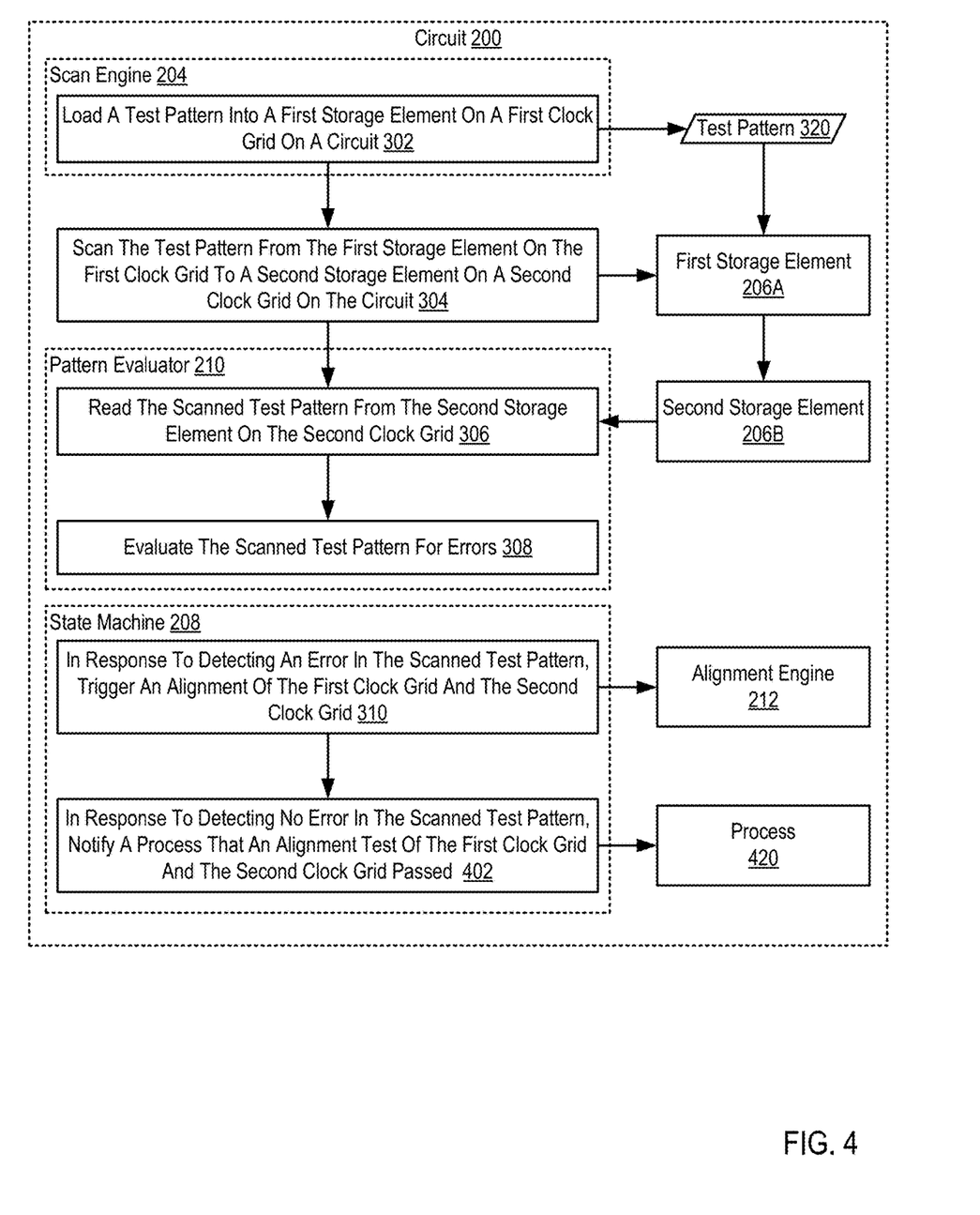
FIG. 4 sets forth a flow chart illustrating an exemplary method for automatic detection of clock grid misalignments and automatic realignment according to embodiments of the present invention.

For further explanation, FIG. 4 sets forth a flow chart illustrating a further exemplary method for automatic detection of clock grid misalignments and automatic realignment according to embodiments of the present invention that includes loading (302) a test pattern (320) into a first storage element (206A) on a first clock grid on a circuit (200); scanning (304) the test pattern (320) from the first storage element (206A) on the first clock grid to a second storage element (206B) on a second clock grid on the circuit (200); reading (306) the scanned test pattern from the second storage element (206B) on the second clock grid; evaluating (308) the scanned test pattern for errors; and in response to detecting an error in the scanned test pattern, triggering (310) an alignment of the first clock grid and the second clock grid.

The method of FIG. 4 differs from the method of FIG. 3, however, in that the method of FIG. 4 further includes in response to detecting no error in the scanned test pattern, notifying (402) a process (420) that an alignment test of the first clock grid and the second clock grid passed. Notifying (402) a process (420) that an alignment test of the first clock grid and the second clock grid passed may be carried out by the state machine (208) receiving a signal from the pattern evaluator (210) that the scanned test pattern matches the unscanned test pattern, and no errors have been detected. In response, the state machine (208) indicates to a higher-level process (420) that the clock grids are aligned. The higher-level process (420) may be a software process external to the circuit (200), such as firmware or an operating system.

The notification that the alignment test of the first clock grid and the second clock grid passed may indicate that the first clock grid and the second clock grid are aligned to a degree based on the test pattern used in the alignment test. For example, a longer test pattern or a test pattern with a greater number of high-low or low-high transitions may be used in an alignment test to indicate a relatively high degree of alignment. Similarly, a shorter test pattern or a test pattern with fewer high-low or low-high transitions may be used in an alignment test to indicate a relatively low degree of alignment (although a greater degree of alignment may exist). As an example, a first alignment test may be performed on two clock grids using a first test pattern that is short with few high-low and low-high transitions. The first alignment test may pass. However, a second alignment test may be performed subsequent to the first alignment test. The second alignment test may use a second test pattern that is longer with a greater number high-low and low-high transitions. The second alignment test may fail, indicating that the degree of alignment between the two clock grids was sufficient to pass the first alignment test but insufficient to pass the second alignment test.

The notification that the alignment test of the first clock grid and the second clock grid passed may include an indication of the degree of alignment tested by the test pattern. For example, if a longer test pattern and/or a test pattern with a greater number of high-low or low-high transitions were used in the alignment test, the notification may include an indication that the first clock grid and the second clock grid are aligned to a relatively high degree of alignment. Similarly, if a shorter test pattern and/or a test pattern with fewer high-low or low-high transitions were used in the alignment test, the notification may include an indication that the first clock grid and the second clock grid are aligned to a relatively low degree of alignment (although a greater degree of alignment may exist).

Figure 5:
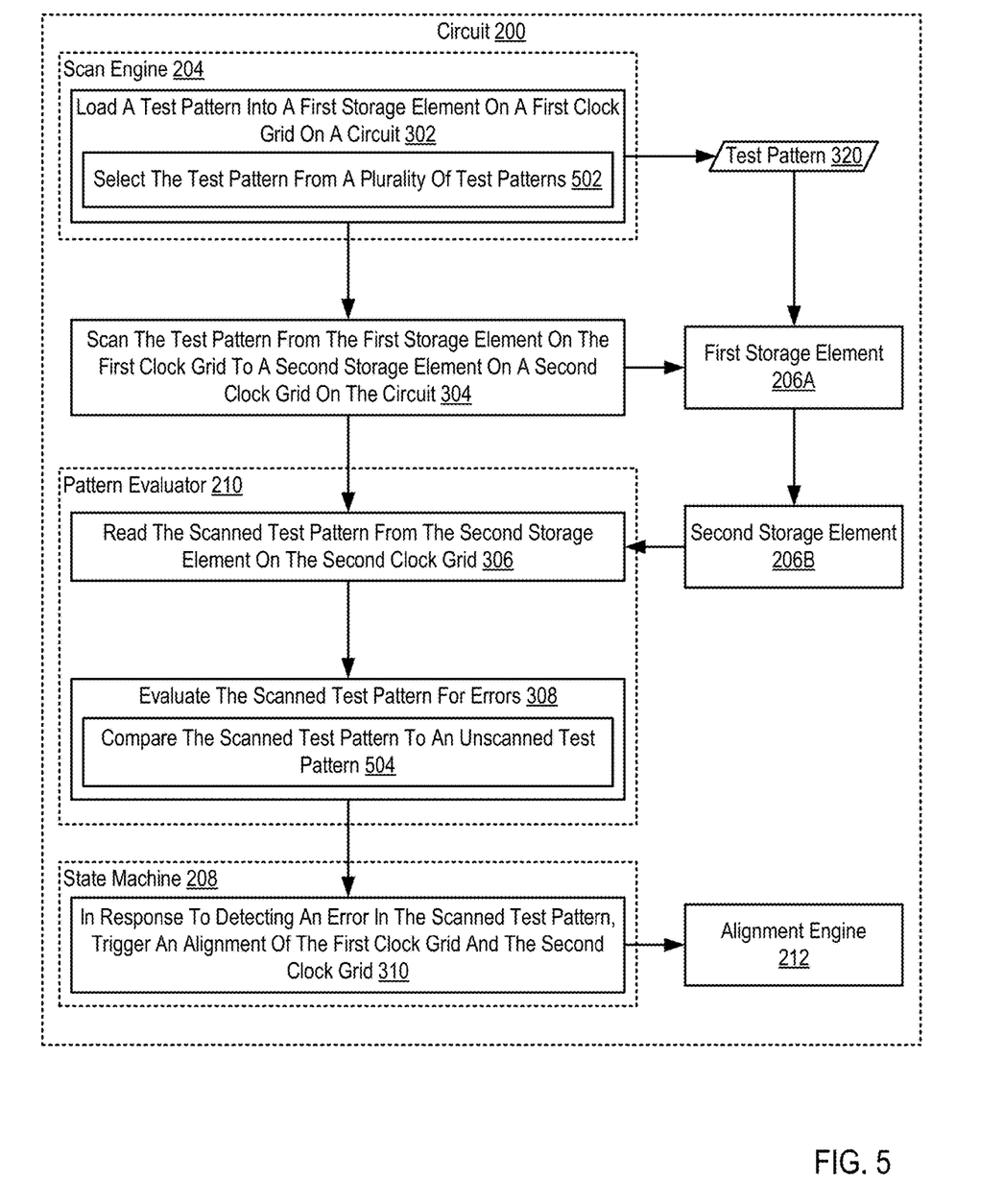
FIG. 5 sets forth a flow chart illustrating an exemplary method for automatic detection of clock grid misalignments and automatic realignment according to embodiments of the present invention.

For further explanation, FIG. 5 sets forth a flow chart illustrating a further exemplary method for automatic detection of clock grid misalignments and automatic realignment according to embodiments of the present invention that includes loading (302) a test pattern (320) into a first storage element (206A) on a first clock grid on a circuit (200); scanning (304) the test pattern (320) from the first storage element (206A) on the first clock grid to a second storage element (206B) on a second clock grid on the circuit (200); reading (306) the scanned test pattern from the second storage element (206B) on the second clock grid; evaluating (308) the scanned test pattern for errors; and in response to detecting an error in the scanned test pattern, triggering (310) an alignment of the first clock grid and the second clock grid.

The method of FIG. 5 differs from the method of FIG. 3, however, in that loading (302) a test pattern (320) into a first storage element (206A) on a first clock grid on a circuit (200) includes selecting (502) the test pattern from a plurality of test patterns. Selecting (502) the test pattern from a plurality of test patterns may be carried out by the state machine (208) or scan engine (204) selecting a test pattern to load into the first storage element (206A). The state machine (208) may select a test pattern and send the test pattern, or identifier of the test pattern, to the scan engine (204) and the pattern evaluator (210). Alternatively, the scan engine (204) may select a test pattern and send the test pattern, or identifier of the test pattern, to the pattern evaluator (210).

A test pattern may be selected according to the circumstances of the alignment test. For example, a longer more robust test pattern may be selected in circumstances in which a greater number of cycles are available for the alignment test or if a precise alignment between the clock grids is desired. A shorter less robust test pattern may be selected in circumstances in which fewer cycles are available for the alignment test or if a less precise alignment is tolerable.

The method of FIG. 5 also differs from the method of FIG. 3 in that evaluating (308) the scanned test pattern for errors includes comparing (502) the scanned test pattern to an unscanned test pattern. Comparing (504) the scanned test pattern to an unscanned test pattern may be carried out by the pattern evaluator (210) accessing a version of the test pattern that is the same as the test pattern that is loaded into the first storage element (206A). The pattern evaluator (210) may compare each bit as it is read from the second storage element (206B) to a corresponding r bit from the unscanned test pattern to determine whether the bits match.

Figure 6:
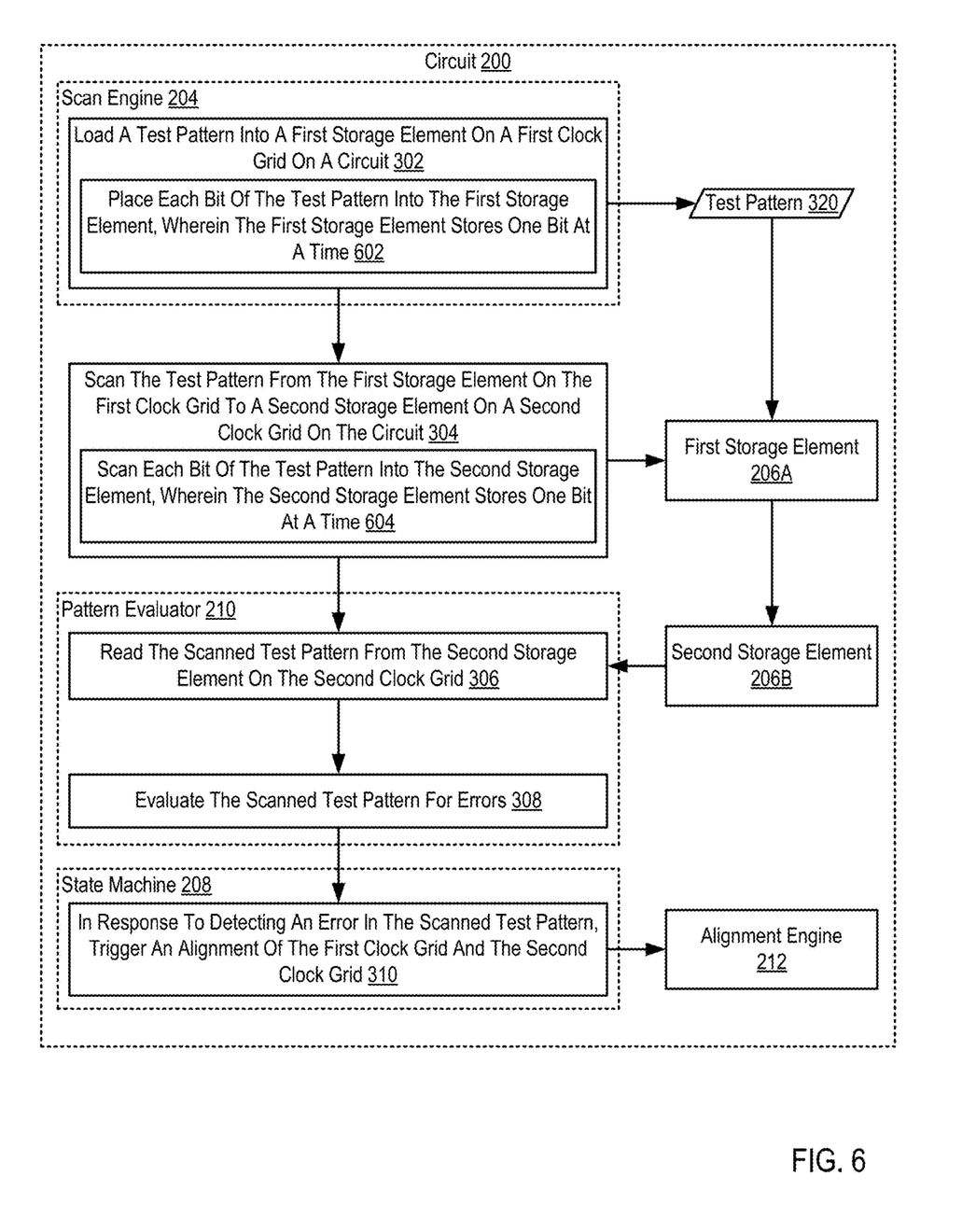
FIG. 6 sets forth a flow chart illustrating an exemplary method for automatic detection of clock grid misalignments and automatic realignment according to embodiments of the present invention.

For further explanation, FIG. 6 sets forth a flow chart illustrating a further exemplary method for automatic detection of clock grid misalignments and automatic realignment according to embodiments of the present invention that includes loading (302) a test pattern (320) into a first storage element (206A) on a first clock grid on a circuit (200); scanning (304) the test pattern (320) from the first storage element (206A) on the first clock grid to a second storage element (206B) on a second clock grid on the circuit (200); reading (306) the scanned test pattern from the second storage element (206B) on the second clock grid; evaluating (308) the scanned test pattern for errors; and in response to detecting an error in the scanned test pattern, triggering (310) an alignment of the first clock grid and the second clock grid.

The method of FIG. 6 differs from the method of FIG. 3, however, in that loading (302) a test pattern (320) into a first storage element (206A) on a first clock grid on a circuit (200) includes placing (602) each bit of the test pattern (320) into the first storage element (206A), wherein the first storage element (206A) stores one bit at a time. Placing (602) each bit of the test pattern (320) into the first storage element (206A), wherein the first storage element (206A) stores one bit at a time may be carried out by the scan engine (204) placing one bit (i.e., signal) of the test pattern on the first storage element (206A) at a time.

The method of FIG. 6 also differs from the method of FIG. 3 in that scanning (304) the test pattern (320) from the first storage element (206A) on the first clock grid to a second storage element (206B) on a second clock grid on the circuit (200) includes scanning (604) each bit of the test pattern (320) into the second storage element (206B), wherein the second storage element (206B) stores one bit at a time. Scanning (604) each bit of the test pattern (320) into the second storage element (206B), wherein the second storage element (206B) stores one bit at a time may be carried out by clock signals on the first clock grid and second clock grid that cause the signal stored in the first storage element (206A) to transfer into the second storage element (206B).

The first storage element (206A) and the second storage element (206B) may be latches coupled to one another along a scan path. As each bit of the test pattern is placed in the first storage element (206A), the bit is scanned into the second storage element (206B) and read out by the pattern evaluator (210). The pattern evaluator (210) may read each bit, one at a time, and compare each bit to the corresponding bit from the unscanned test pattern.

In view of the explanations set forth above, readers will recognize that the benefits of automatic detection of clock grid misalignments and automatic realignment according to embodiments of the present invention include:
  Improving the operation of a computing system by testing the alignment of two clock grids on a circuit to determine if alignment is necessary, increasing circuit reliability and accuracy.
  Improving the operation of a computing system by testing the alignment of two clock grids on a circuit without measuring the quality of signals sent across the two clock grids, increasing circuit efficiency.
  Improving the operation of a computing system by testing the alignment of two clock grids on a circuit automatically in response to internal triggers, increasing circuit efficiency and autonomy.

Exemplary embodiments of the present invention are described largely in the context of a fully functional computer system for automatic detection of clock grid misalignments and automatic realignment. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of automatic detection of clock grid misalignments and automatic realignment, the method comprising:
   loading a test pattern into a first storage element on a first clock grid on a circuit;
   scanning the test pattern from the first storage element on the first clock grid to a second storage element on a second clock grid on the circuit;
   reading the scanned test pattern from the second storage element on the second clock grid;
   evaluating, within the first clock grid, the scanned test pattern received from the second clock grid for errors; and
   in response to detecting an error in the scanned test pattern from the second storage element on the second clock grid, triggering an alignment of the first clock grid and the second clock grid.

2. The method of claim 1, further comprising:
   in response to detecting no error in the scanned test pattern, notifying a process that an alignment test of the first clock grid and the second clock grid passed.

3. The method of claim 1, wherein evaluating the scanned test pattern for errors comprises comparing the scanned test pattern to an unscanned test pattern.

4. The method of claim 1, wherein loading the test pattern into the first storage element on the first clock grid on the circuit comprises selecting the test pattern from a plurality of test patterns.

5. The method of claim 1,
   wherein loading the test pattern into the first storage element on the first clock grid on the circuit comprises loading the test pattern on a scan engine, loading the test pattern on a pattern evaluator, and loading, by the scan engine, the test pattern into the first storage element, and
   wherein evaluating the scanned test pattern for errors comprises comparing, by the pattern evaluator, the scanned test pattern to the loaded test pattern.

6. The method of claim 1,
   wherein loading the test pattern into the first storage element on the first clock grid on the circuit comprises placing each bit of the test pattern into the first storage element, wherein the first storage element stores one bit at a time, and
   wherein scanning the test pattern from the first storage element on the first clock grid to the second storage element on the second clock grid on the circuit comprises scanning each bit of the test pattern into the second storage element, wherein the second storage element stores one bit at a time.

7. The method of claim 1, wherein the first storage element is a first latch on the first clock grid, and wherein the second storage element is a second latch on the second clock grid.

8. A circuit for automatic detection of clock grid misalignments and automatic realignment, the circuit comprising circuitry that causes the circuit to carry out the steps of:
   loading a test pattern into a first storage element on a first clock grid on the circuit;
   scanning the test pattern from the first storage element on the first clock grid to a second storage element on a second clock grid on the circuit;
   reading the scanned test pattern from the second storage element on the second clock grid;
   evaluating, within the first clock grid, the scanned test pattern received from the second clock grid for errors; and
   in response to detecting an error in the scanned test pattern from the second storage element on the second clock grid, triggering an alignment of the first clock grid and the second clock grid.

9. The circuit of claim 8, wherein the circuitry further causes the circuit to carry out the step of:

in response to detecting no error in the scanned test pattern, notifying a process that an alignment test of the first clock grid and the second clock grid passed.

10. The apparatus of claim 8, wherein evaluating the scanned test pattern for errors comprises comparing the scanned test pattern to an unscanned test pattern.

11. The apparatus of claim 8, wherein loading the test pattern into the first storage element on the first clock grid on the circuit comprises selecting the test pattern from a plurality of test patterns.

12. The apparatus of claim 8,
wherein loading the test pattern into the first storage element on the first clock grid on the circuit comprises loading the test pattern on a scan engine, loading the test pattern on a pattern evaluator, and loading, by the scan engine, the test pattern into the first storage element, and
wherein evaluating the scanned test pattern for errors comprises comparing, by the pattern evaluator, the scanned test pattern to the loaded test pattern.

13. The apparatus of claim 8,
wherein loading the test pattern into the first storage element on the first clock grid on the circuit comprises placing each bit of the test pattern into the first storage element, wherein the first storage element stores one bit at a time, and
wherein scanning the test pattern from the first storage element on the first clock grid to the second storage element on the second clock grid on the circuit comprises scanning each bit of the test pattern into the second storage element, wherein the second storage element stores one bit at a time.

14. The apparatus of claim 8, wherein the first storage element is a first latch on the first clock grid, and wherein the second storage element is a second latch on the second clock grid.

15. A computer program product for automatic detection of clock grid misalignments and automatic realignment, the computer program product disposed upon a computer readable medium, the computer program product comprising computer program instructions that, when executed, cause a circuit to carry out the steps of:
loading a test pattern into a first storage element on a first clock grid on the circuit;
scanning the test pattern from the first storage element on the first clock grid to a second storage element on a second clock grid on the circuit;
reading the scanned test pattern from the second storage element on the second clock grid;
evaluating, within the first clock grid, the scanned test pattern received from the second clock grid for errors; and
in response to detecting an error in the scanned test pattern from the second storage element on the second clock grid, triggering an alignment of the first clock grid and the second clock grid.

16. The computer program product of claim 15, wherein the computer program instructions further cause the circuit to carry out the step of:
in response to detecting no error in the scanned test pattern, notifying a process that an alignment test of the first clock grid and the second clock grid passed.

17. The computer program product of claim 15, wherein evaluating the scanned test pattern for errors comprises comparing the scanned test pattern to an unscanned test pattern.

18. The computer program product of claim 15, wherein loading the test pattern into the first storage element on the first clock grid on the circuit comprises selecting the test pattern from a plurality of test patterns.

19. The computer program product of claim 15,
wherein loading the test pattern into the first storage element on the first clock grid on the circuit comprises loading the test pattern on a scan engine, loading the test pattern on a pattern evaluator, and loading, by the scan engine, the test pattern into the first storage element, and
wherein evaluating the scanned test pattern for errors comprises comparing, by the pattern evaluator, the scanned test pattern to the loaded test pattern.

20. The computer program product of claim 15,
wherein loading the test pattern into the first storage element on the first clock grid on the circuit comprises placing each bit of the test pattern into the first storage element, wherein the first storage element stores one bit at a time, and wherein scanning the test pattern from the first storage element on the first clock grid to the second storage element on the second clock grid on the circuit comprises scanning each bit of the test pattern into the second storage element, wherein the second storage element stores one bit at a time.

\* \* \* \* \*